Figure 1:
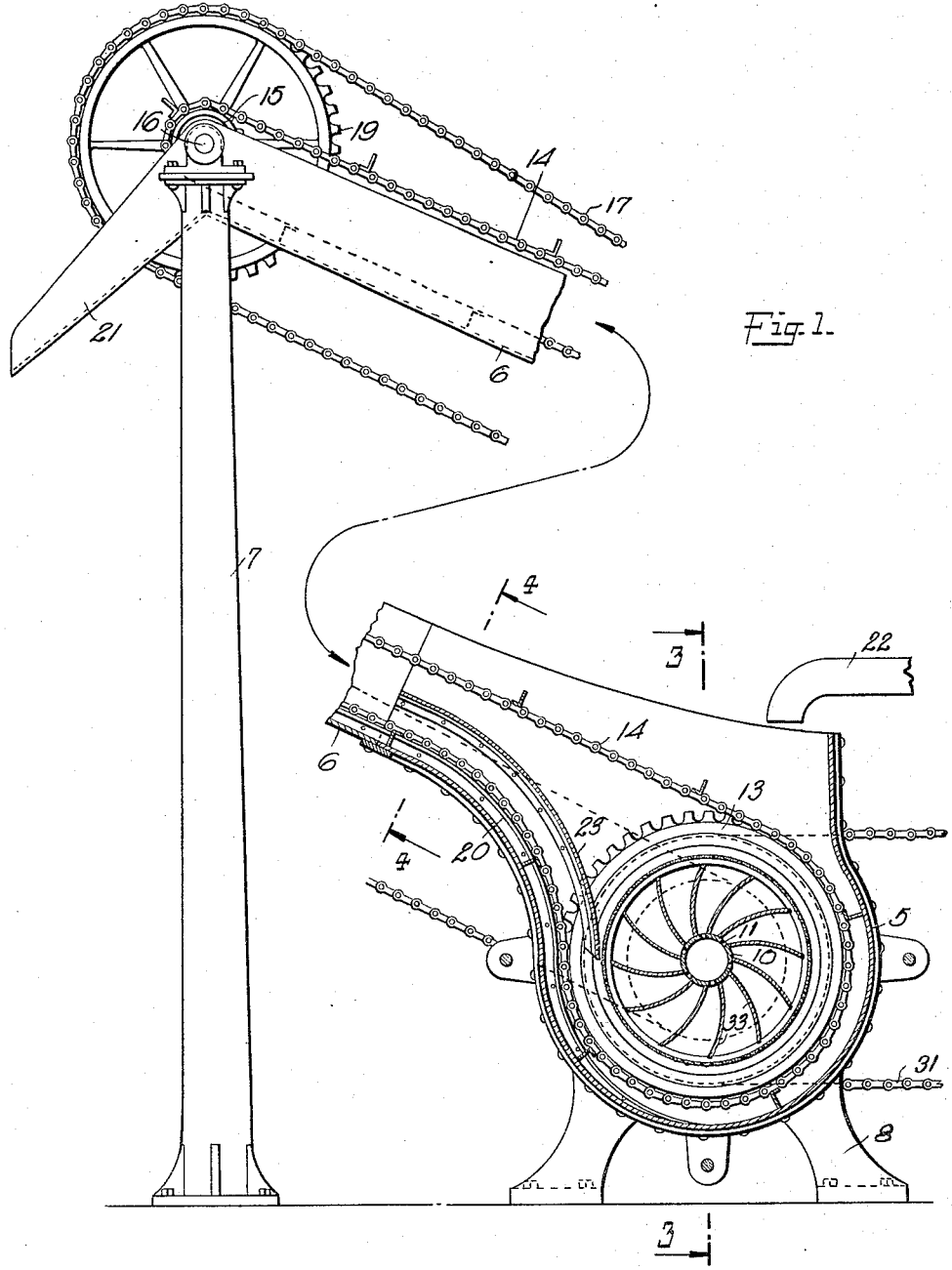

R. LABRADOR Y GUIJARRO.
FILTER.
APPLICATION FILED NOV. 5, 1915.

1,195,000.

Patented Aug. 15, 1916.
3 SHEETS—SHEET 1.

WITNESSES

INVENTOR
Ricardo Labrador y Guijarro
BY
ATTORNEYS

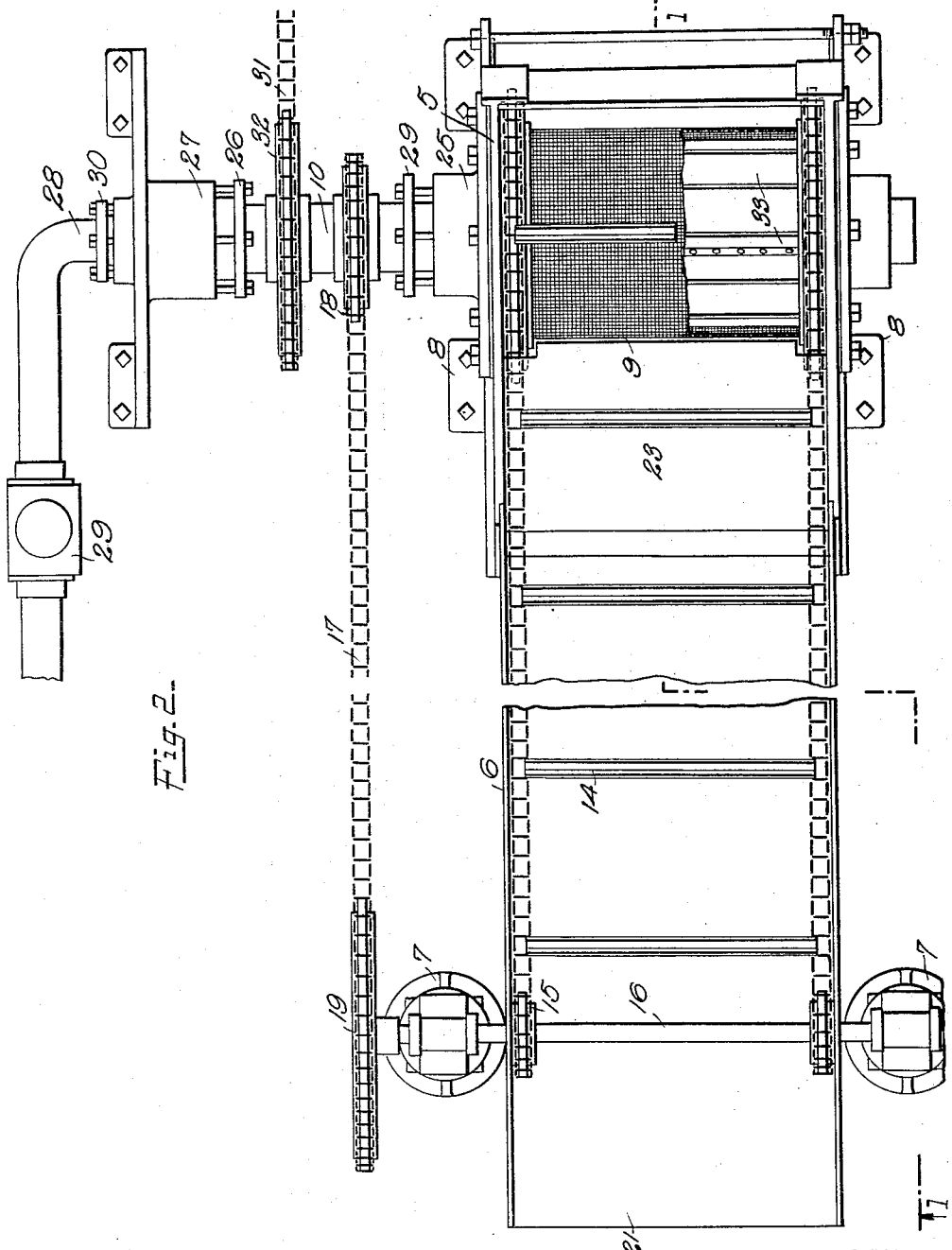

R. LABRADOR Y GUIJARRO.
FILTER.
APPLICATION FILED NOV. 5, 1915.
1,195,000.
Patented Aug. 15, 1916.
3 SHEETS—SHEET 3.
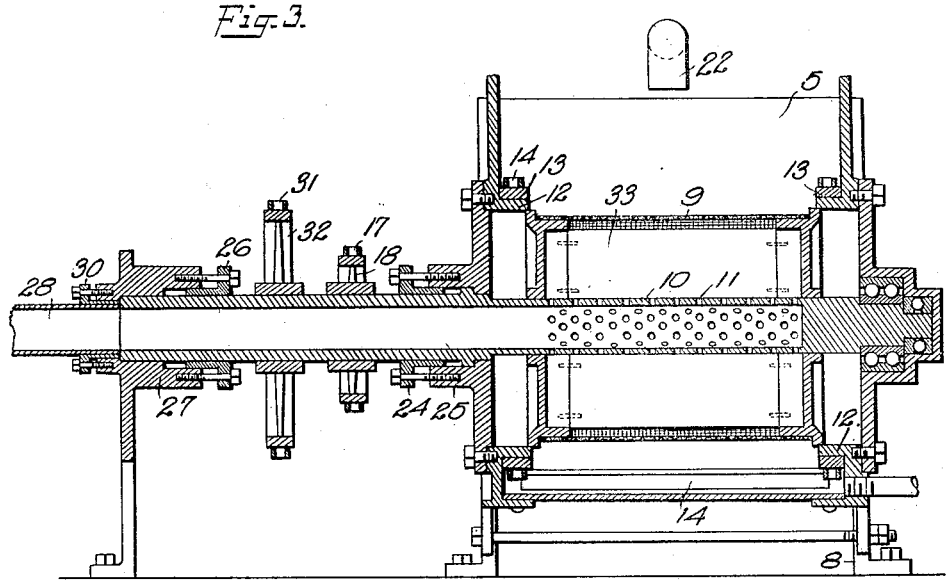
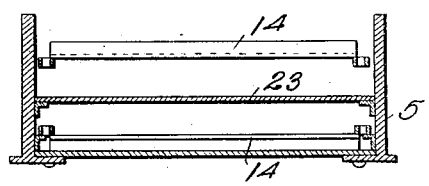
WITNESSES
George L. Blume.
INVENTOR
Ricardo Labrador y Guijarro
BY
ATTORNEYS

UNITED STATES PATENT OFFICE.

RICARDO LABRADOR Y GUIJARRO, OF HABANA, CUBA.

FILTER.

1,195,000.  Specification of Letters Patent.  Patented Aug. 15, 1916.

Application filed November 5, 1915. Serial No. 59,762.

*To all whom it may concern:*

Be it known that I, RICARDO LABRADOR Y GUIJARRO, a citizen of the Republic of Cuba, and a resident of Habana, Cuba, have invented a new and Improved Filter, of which the following is a full, clear, and exact description.

My invention relates to filters of the rotary type.

The object thereof is to provide a simple, inexpensive and efficient filter which is characterized by the provision of a filtering drum with which a vacuum pump is associated to draw the filtered liquid to the axial part of the drum, while the solid particles are driven off the filtering drum by the centrifugal force thereof and scraped and discharged by a suitable conveyer coöperating with the filtering drum.

Reference is to be had to the accompanying drawings, forming part of the specification, in which like characters indicate corresponding parts in all the views and in which:

Figure 1 is a fragmentary elevation, partly in section, of the apparatus on line 1—1, Fig. 2; Fig. 2 is a plan view of the apparatus, a portion of the filtering drum being broken away to show the details of construction; Fig. 3 is a transverse section on line 3—3, Fig. 1; and Fig. 4 is a cross section on line 4—4, Fig. 1.

Referring to the drawings, 5 is a substantially cylindrical tank disposed horizontally. It is open at the upper part through the entire width of its lateral surface and it extends to one side to engage the lower end of a rising trough 6, the upper end of the trough being maintained by supports 7, suitable supports 8 being provided for the tank. A filtering drum 9 is mounted within the tank 5 on a hollow shaft 10, a portion of which projects through one end of the tank. The lateral surface of the filtering drum 9 is formed of a fine mesh. The portion of the hollow shaft inclosed between the ends of the drum has perforations 11. The end walls of the tank are provided with collars 12 with which the end walls of the drum are flush. The shaft, being secured to the drum, is prevented from lateral displacement by the collars of the shaft in the bearings. The collars 12 of the tank form bearings for toothed wheels 13 engaged by endless chains of the conveyer 14. Said chains of the conveyer engage also toothed pinions 15 mounted on a shaft 16 which is rotatably mounted in bearings carried by the supports 7.

The motion of the shaft 16 is transmitted from the hollow shaft 10 preferably through the medium of an endless chain 17 engaging suitable sprockets 18 and 19 on the hollow shaft 10 and shaft 16 respectively. The toothed wheels 13 are of such a diameter as to cause the transverse bars of the conveyer to travel in close proximity to the lateral surface of the tank 5 and prevent any particles from adhering to the surface of the tank. The side walls of the trough 6 are provided with chain beds 20 to relieve the weight of the chains from the transverse bars of the conveyer as the bars are moved on the bottom of the trough so that the same will carry any solid particles to the upper end of the trough and discharge them through a chute 21 provided at the said end of the conveyer.

The substance to be filtered is supplied to the tank 5 at the top through a pipe 22. To prevent the mass within the tank from being set into rotation by the revolution of the filtering drum, a curved baffle plate 23 is provided within the tank. The baffle plate is set so that the effective end thereof is preferably tangent to the filtering drum. The projecting end of the hollow shaft 10 carries a stuffing gland 24 which engages an outer collar 25 of the tank 5 forming one of the bearings for the shaft 10. A similar stuffing gland 26 is carried by the shaft 10 which engages a bearing 27 of the shaft. Said bearing 27 connects the pipe 28 of the vacuum pump 29 with the hollow shaft 10 through the medium of a packing gland 30.

Motion is imparted to the shaft 10 preferably through the medium of a chain 31 engaging a toothed wheel 32 on the shaft. The rotation of the drum will tend to maintain the mass to be filtered away from the periphery of the drum, but due to the vacuum created by the pump 29 the liquid part of the mass will pass through the fine mesh of the drum. To facilitate the flow of the liquid mass to the perforations 11, the drum is provided interiorly with curved vanes or blades 33. These blades will also prevent the accumulation of a liquid mass in the lower part of the drum. The effective end of the baffle plate 23, being substantially tangent to the surface of the drum, deflects more perfectly the liquid that is set into rotation by the rotary movement of the drum. It, therefore, breaks the rotary motion of the solid particles in the mass to be filtered and causes it to flow toward the bottom of the tank 5, from where the solid particles are scraped, along the bottom of the trough, to be discharged through the chute 21. The scraping bars of the conveyer that travel about the filtering drum also tend to break up the rotary movement of the mass to be filtered.

I claim:

1. In a filter, a tank, a revoluble filtering drum, means for revolving the drum, means for creating a vacuum in the axial part of the drum, vanes in the drum for facilitating the flow of liquid from the periphery of the drum to the axial part thereof, a trough rising from the tank, a conveyer mounted to move in the tank and trough for raising the solid particles from the tank to the upper end of the trough, and means for actuating the conveyer operable by the means for rotating the drum.

2. In a filter, a tank, a revoluble filtering drum, means for revolving the drum, means for creating a vacuum in the axial part of the drum, vanes in the drum for facilitating the flow of liquid from the periphery to the axial part of the drum, a baffle plate for preventing the rotation of the mass to be filtered within the tank, one edge of said plate being substantially tangent to the lateral surface of the filtering drum, a trough rising from the tank, and a conveyer moving in the tank and trough for raising the solid particles from the tank to the upper end of the trough.

3. In a filter, a cylindrical tank, a revoluble filtering cylinder in the tank and co-axial therewith, a hollow shaft for said tank having perforations within the drum, means for revolving the shaft, means for creating a vacuum within the hollow shaft, vanes in the drum for facilitating the flow of liquid from the periphery of the drum to the perforations in the hollow shaft, a trough rising from the tank, a conveyer mounted to move in the tank and trough and about the filtering drum, said conveyer having means adapted to move along the lateral surface of the tank and the bottom of the trough, whereby the solid particles in the tank are moved to the upper end of the trough, and a baffle plate within said tank.

4. In a filter, a cylindrical tank having inwardly-directed collars from the end walls of the tank, a filtering drum located between said end collars, a hollow shaft maintaining said drum co-axial with the tank, said hollow shaft having perforations within the drum, means for rotating the shaft, means for creating a vacuum in the hollow of the shaft, vanes for facilitating the flow of liquid from the periphery of the drum to the hollow shaft, a rising trough from the tank, a shaft rotatably mounted at the upper end of the trough, toothed wheels rotatably mounted on the collars in the tank, toothed pinions mounted on the shaft at the upper end of the trough, a conveyer engaging said toothed wheels and pinions, means for transmitting motion to the shaft at the upper end of the trough from the hollow shaft, said conveyer having scraping members, and a baffle plate within the tank having one edge thereof disposed tangentially to the lateral surface of the filtering drum, said trough having a chute at its upper end wherethrough the solid particles raised by the conveyer from the tank are discharged.

5. In a filter, a tank, a revoluble filtering drum within, means for revolving the drum, means for creating a vacuum in the axial part of the drum whereby the liquid to be filtered is drawn through the periphery of the filtering drum to the axial part thereof, a trough rising from the tank, a conveyer mounted to move about the drum in the tank and in the trough for raising the solid particles from the tank to the upper end of the trough, and means located between the conveyer adjacent the drum for breaking up the rotary movement of the liquid to be filtered.

6. In a filter, a tank, a revoluble filtering drum, means for revolving the drum, means for creating a vacuum in the axial part of the drum, means for preventing the rotation of the mass to be filtered within the tank, and conveyer means within the tank for eliminating solid particles therefrom.

In testimony whereof I have signed my name to this specification in the presence of two subscribing witnesses.

RICARDO LABRADOR Y GUIJARRO.

Witnesses:
RICHARD WILSON,
MANUEL DE GÓNGORA.